(12) United States Patent
Stevens et al.

(10) Patent No.: US 8,570,697 B2
(45) Date of Patent: Oct. 29, 2013

(54) APPARTUS AND METHOD FOR PROTECTING SIGNAL AND COMMUNICATION LINES FROM VERY HIGH VOLTAGE AND TRANSIENT PULSES

(75) Inventors: Paul Stevens, Oro Valley, AZ (US); Alex Wedin, Tucson, AZ (US); Dale Trumbo, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 155 days.

(21) Appl. No.: 13/230,716

(22) Filed: Sep. 12, 2011

(65) Prior Publication Data

US 2013/0063851 A1      Mar. 14, 2013

(51) Int. Cl.
*H02H 3/20*  (2006.01)
*H02H 3/00*  (2006.01)
(52) U.S. Cl.
USPC ............................................ 361/91.1; 361/86
(58) Field of Classification Search
USPC .................................................. 361/91.1, 86
See application file for complete search history.

(56) References Cited

U.S. PATENT DOCUMENTS

| 6,922,322 | B2 | 7/2005 | Strayer et al. | |
|---|---|---|---|---|
| 7,646,576 | B2 | 1/2010 | Harris et al. | |
| 2009/0034139 | A1* | 2/2009 | Martin | 361/91.1 |
| 2009/0109587 | A1* | 4/2009 | Smith et al. | 361/86 |
| 2009/0116158 | A1* | 5/2009 | Graves et al. | 361/86 |
| 2010/0067158 | A1* | 3/2010 | Saarinen | 361/91.1 |

* cited by examiner

*Primary Examiner* — Scott Bauer
(74) *Attorney, Agent, or Firm* — Shimokaji & Assoc., P.C.

(57) ABSTRACT

Apparatus for protecting a signal line bus driver from overvoltage faults may include a first solid-state switch configured to block current having a positive voltage when open and a second solid-state switch configured to block current having a negative voltage when open. A comparator circuit may produce a output signal responsively to presence of a fault-induced voltage in the signal line that has a magnitude that exceeds the reference voltage. The first and second switches may be connected in series with one another and with the bus driver. The switches may be interposed between the bus driver and an output end of the signal line and may responsively to the comparator circuit output signal.

18 Claims, 4 Drawing Sheets

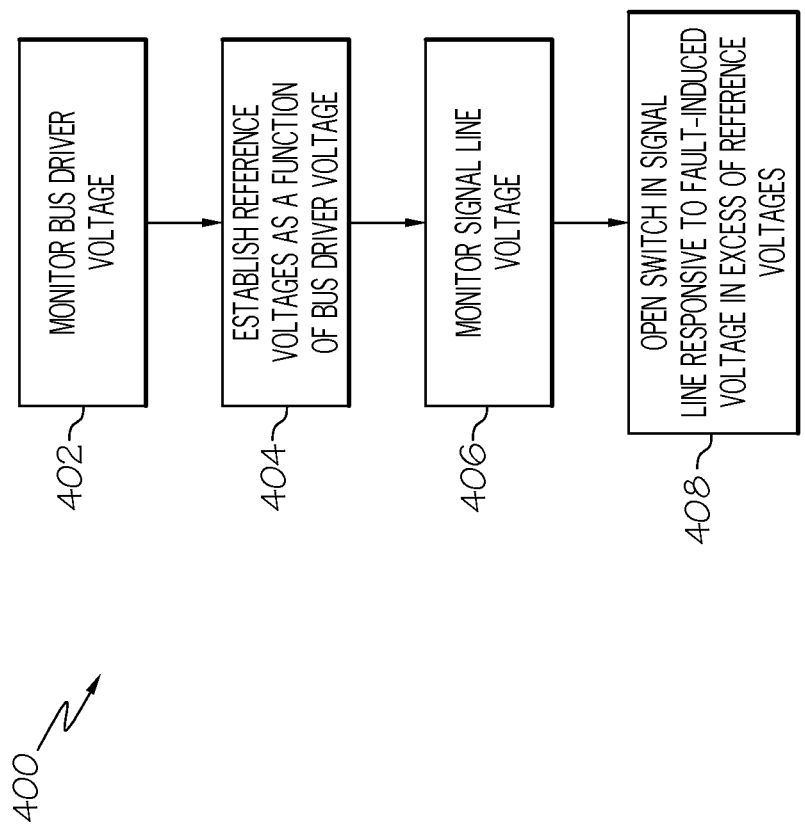

APPARATUS AND METHOD FOR PROTECTING SIGNAL AND COMMUNICATION LINES FROM VERY HIGH VOLTAGE AND TRANSIENT PULSES

BACKGROUND OF THE INVENTION

The present invention generally relates to apparatus and methods for the protection of signal and communications circuits from very high voltage and transient pulses.

In modern aircraft there may be numerous signal and communications circuits which may operate at various voltages. Some of these circuits may be vulnerable to potential damage that may result from high voltage transient pulses that may arise from lightning strikes. Additionally, such circuits require protection from potential damage that may result from inadvertent connection or insulation failures that may cause signal and communication conductors to come into electrical contact with aircraft power buses.

As can be seen, there is a need for a protection system for such signal and communication circuits which may be implemented in numerous locations in an aircraft. In that regard, there is a need for such a system that may be implemented with low-cost and light-weight components. In the case of transient (e.g., lightning-induced) pulses, there is a need for such a system to be capable of automatically reestablishing normal operation of the signal line after the fault condition is removed or the energy from a lightning induced pulse is dissipated.

SUMMARY OF THE INVENTION

In one aspect of the present invention, Apparatus for protecting a signal line bus driver from overvoltage faults may comprise a first solid-state switch configured to block current having a positive voltage when open; a second solid-state switch configured to block current having a negative voltage when open; and a comparator circuit connected to: receive bus-driver output voltage from the bus driver; receive a reference voltage that has a magnitude that exceeds the bus driver output voltage by a predetermined magnitude; and produce a comparator output signal responsively to presence of a fault-induced voltage in a signal line that has a magnitude that exceeds the reference voltage, the first and second switches being connected in series with one another, being connected in series with the bus driver, being interposed between the bus driver and an output end of the signal line and being connected so that at least one of the solid-state switches opens responsively to the comparator output signal.

In another aspect of the present invention, a method for protecting a signal line bus driver may comprise the steps of: monitoring a bus driver output voltage; establishing a reference voltage with a magnitude that has a predetermined threshold value greater than the magnitude of the bus driver output voltage; monitoring voltage on a signal line to determine presence of fault-induced voltage in excess of the reference voltage; and opening at least one solid-state switch in the signal line responsively to presence of fault-induced voltage in excess of the reference voltage In still another aspect of the invention, a method for protecting a bus driver of a signal line may comprise the steps of: positioning a solid-state switch in the signal line between a bus driver and an output end of the signal line; monitoring signal line voltage on both sides of the switch; activating the switch responsively to detection of a differential voltage magnitude across the switch that exceeds a predetermined threshold magnitude; and protecting a comparator circuit that monitors signal line voltage at the output end of the signal line with a clamping circuit.

These and other features, aspects and advantages of the present invention will become better understood with reference to the following drawings, description and claims.

BRIEF DESCRIPTION OF THE DRAWINGS

FIG. 4 is a flow chart of a method for protecting a signal line bus driver in accordance with an embodiment of the invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a protection circuit that continuously monitors the voltage levels of a signal and communication line or bus, and turns off series connected high voltage switching devices to isolate a communication and signal drive circuit from a faulted condition. It may protect against sustained high voltages of either polarity injected onto the communications bus. The protection circuit may introduce virtually no distortion so that critical rise and fall times required by the communication bus can be maintained. The circuit may be constructed with components that are readily available as non-custom or "off-the shelf" low power devices. Consequently, the circuit may be produced at a low cost and it may be physically small and light; making it particularly suitable for use in avionics applications.

Figure 1:
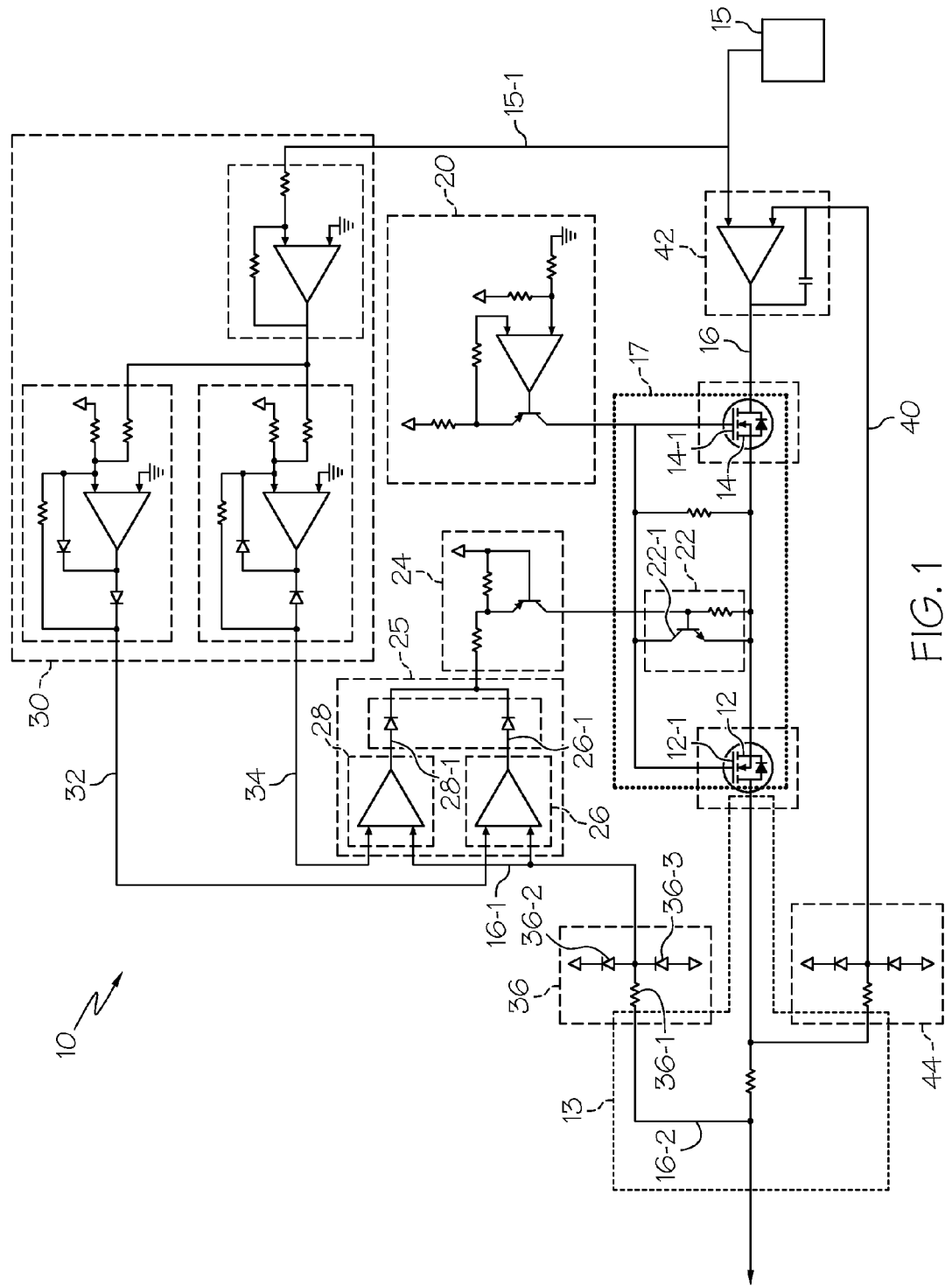
FIG. 1 is a block diagram of a protection circuit for a signal line bus driver in accordance with an embodiment of the invention.

Referring now to FIG. 1, it may be seen that in an exemplary embodiment, a protection circuit 10 may comprise a first solid-state switch 12 and a second solid-state switch 14 connected in series with one another and positioned to be able to block current, with either positive or negative voltage, in a communications or signal line 16. The switches 12 and 14 may be, for example, N-Channel MOSFET's or other high speed, high voltage electronic switch. The protection circuit 10 may be employed to protect against damage to a bus driver 15 from high voltage faults such as lightning induced faults or insulation failures of the signal line 16 which may lead to catastrophic faults.

A constant current source 20 may be connected to gates 12-1 and 14-1 and may act to maintain the switches 12 and 14 in a conducting state under non-fault conditions. A cut-off switch 22 may be connected so that whenever a transistor 22-1 is conducting, the switch 12 may be open, i.e., non-conductive to positive-voltage current and the switch 14 may be open, i.e., non-conductive to negative-voltage current.

The cut-off switch 22 may be interconnected, through a level translator 24, to an overvoltage comparator circuit 25 that may include a positive voltage comparator 26 and a negative overvoltage comparator 28. The cut-off switch 22 may operate to open the switches 12 and 14 whenever magnitude of voltage 16-2 at an output end of the line 16 may exceed a dynamically determined reference voltage. In such a case, the voltage 16-2 may be referred to as fault-induced voltage 16-2.

The arrangement of the switches 12 and 14 may isolate faults to limited regions of the circuit 10. In the case of a positive voltage fault, fault induced voltage 16-2 may be limited to a region 13 (marked by a dotted line enclosure 13). In the case of a negative voltage fault, fault-induced voltage may be limited to the region 13 and a second region 17 (marked by dotted line enclosure 17). In either case, the bus driver 15 may not be exposed to the fault-induced voltage 16-2.

Magnitude of the voltage 16-2 at which the cut-off switch 22 may operate may be determined dynamically as a function of output voltage 15-1 of the bus driver 15. A reference voltage generator circuit 30 may generate a positive reference voltage signal 32 and a negative reference voltage signal 34. The signals 32 and 34 may be produced by the generator circuit 30 at a magnitude that is established at a predetermined threshold level greater than bus driver output voltage 15-1.

Figure 2:
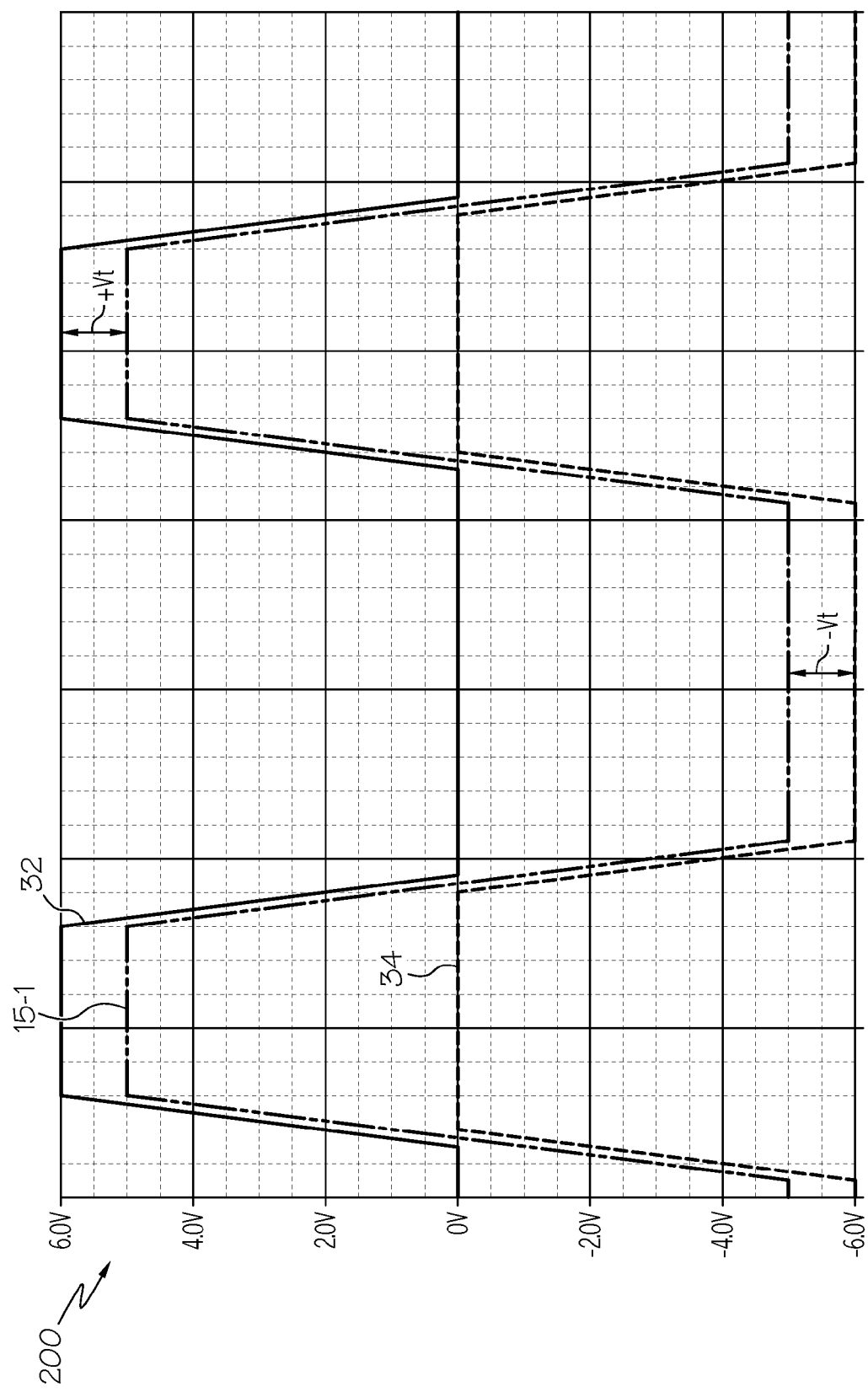
FIG. 2 is a graph illustrating one exemplary embodiment of a relationship of reference voltages and bus driver voltage within the circuit of FIG. 1.

Referring to FIG. 2, a graph 200 displays a condition in which the signal-line voltage may have a nominal excursion range of about +/−1-5 volts. The reference voltage generator circuit 30 may be set to dynamically produce the reference voltage signal 32 at a predetermined threshold level (e.g., 1.0 volts) higher than the voltage 15-1 whenever the voltage 15-1 is positive. The reference voltage generator circuit 30 may also be set to dynamically produce the reference voltage signal 34 at a threshold level of 1.0 volts lower than the voltage 15-1 whenever the voltage 15-1 is negative. It may be seen that whenever the signal line voltage 16-2 is lower than the voltage 32 or higher than the voltage 34, the comparator circuit 25 may not produce the signals 26-1 nor 28-1 and the cut-off switch 22 may remain open. In the event of a fault that adds or subtracts voltage to the nominal signal-line voltage 16-1 in excess of the threshold +Vt or −Vt, the comparator 26 or 28 may produce signals 26-1 or 28-1 that may result in the switch 22 closing and the switches 12 and 14 opening.

Figure 3:
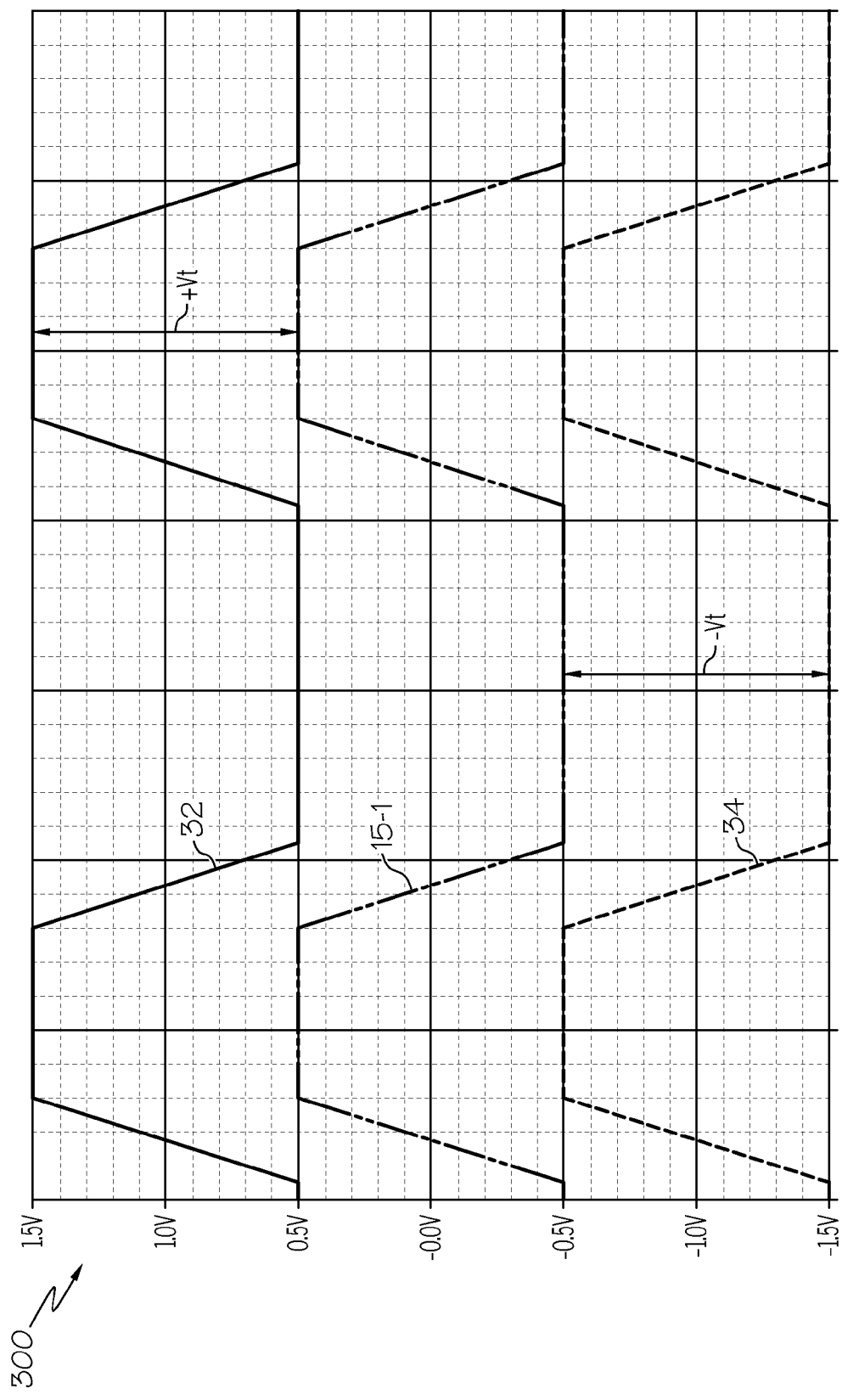
FIG. 3 is a graph illustrating another exemplary embodiment of a relationship of reference voltages and bus driver voltage within the circuit of FIG. 1.

A fault may occur when the bus driver 15 is powered or unpowered. An advantageous feature of the protection circuit 10 is that protection may be provided for the bus driver 15 even when the circuit 10 is in an unpowered condition. In such a case, no voltage may be supplied to the constant current source 20. Consequently the protection switches 12 and 14 may be open, i.e. non-conducting, and the bus driver 15 may be protected. This arrangement is desirable in that there is no need to consume power to provide protection during non-operational periods of the bus diver 15. Referring to FIG. 3, a graph 300 portrays a condition in which the circuit 30 may be set to establish reference voltages 32 and 34 at a threshold of +/−1.5 volt even though the bus driver output voltage 15-1 may have a nominal excursion of only +/−0.5 volt. In other words, the threshold may be greater than the nominal excursion of the voltage 15-1.

In comparing the graphs 200 and 300, it may be seen that the thresholds +Vt and −Vt may be established at any level relative to the bus driver output voltage 15-1. In other words, the circuit 10 may have the capability of protecting against faults that may have comparatively low voltage magnitude relative to the voltage 15-1 or faults that may have comparatively high voltage magnitude relative to the voltage 15-1.

As a general matter, it may be noted that the positive threshold +Vt may be set to be just above the voltage 15-1 or zero whichever is more positive. The negative threshold −Vt may be set to be just below the voltage 15-1 or zero, whichever is more negative. The thresholds may be set in this manner because a signal in the line 16 may be loaded down from its positive or negative value toward a ground reference. However, if a positive signal goes more positive or below ground, it may be because an external influence (i.e., a fault condition) is responsible for driving the signal to those conditions. Likewise if a negative signal goes more negative or above ground this may be the result of an external influence.

The protection circuit 10 may be particularly effective because of its inherent speed of detection. Because a comparison point may track the actual signal, an out of tolerance condition can be detected as fast as possible and supply the maximum possible level of protection. Advantageously, the comparators 26 and 28 may be very high-speed devices so that this capability of the circuit 10 is fully realized.

It may be noted that the comparator circuit 25 may be protected from damage that may result from excessive energy that may be applied to the signal line 16 during a fault condition. A comparator-protecting clamping circuit 36 may be interposed between the signal line 16 and the comparator circuit 25. The clamping circuit 36 may include a high impedance resistor 36-1 having a resistance value of about 100,000 ohms. Protective diodes (e.g. signal diodes) 36-2 and 36-3 may be provided between the resistor 36-1 and the comparator circuit 25 so that fault induced energy reaching the comparator circuit 25 may be limited to a level that can be tolerated by the comparators 26 and 28. In a typical fault condition, high impedance of the resistor 36-1 may allow passage of only a few milliamps of current. This minimal current may be easily dissipated through the diodes 36-2 and 36-3. Consequently, the comparators 26 and 28 may be protected from damage that might otherwise be produced by the fault condition.

In the event of a fault condition that may produce, for example, a positive voltage 16-2 in excess of the reference voltage 32 the comparator circuit 25 may produce the signal 26-1 which may result in closing of the switch 22 and opening of the switches 12 and 14. Thus current in the line 16 may be interrupted. If the fault condition is short-lived, e.g., a lightning related fault or inadvertent connection to a power bus, the voltage 16-2 voltage in the line may quickly diminish to a level below the reference voltage 32 and the switch 22 may re-open thereby allowing the signal line 16 to once again regain operational capability. If the fault condition is one of long duration, e.g., a short circuit fault, then the switch 22 may remain closed until a repair is performed. In neither case is it necessary to replace or repair the protection circuit 10 because the protection circuit 10 may not be damaged by the fault condition.

While faults may include high voltage faults such as lightning induced faults or insulation failures of the signal line 16 which may lead to short circuit faults, the circuit 10 may perform successfully even though the switches 12 and 14 may be rated for only low current applications. In other words, the switches 12 and 14 may be advantageously low-power devices that may be small and inexpensive "off-the shelf" components. This is because the switches 12 and 14 may not be required to conduct or dissipate fault energy. Similarly, the comparators 26 and 28 may be selected as "off-the-shelf" components because they are protected from high energy damage by the clamping circuit 36.

It may be noted that the protection circuit 10 may be configured so that the switches 12 and 14 are within a closed loop 40 which may interconnect a bus buffer 40 and the switches 12 and 14. A buffer-protecting clamping circuit 44, similar to the protection clamping circuit 36, may be interposed within the closed loop 40. The buffer 42 and the closed loop 40 may act to insure integrity of the signal voltage 16-1 during normal (i.e., non-fault) operation of the signal line 16. In other words, signal distortion that might otherwise be produced by presence of the switches 12 and 14 in the signal line 16 may be mitigated.

Referring now to FIG. 4, a flow chart may illustrate an exemplary embodiment of a method for providing protection for a signal and communication lines. In a step 402, signal line voltage at a source end of the signal line may be monitored (e.g., the reference voltage generator 30 may be connected to receive the bus driver output voltage 15-1 from the bus driver 15). In a step 404, a reference voltage with a magnitude that has a predetermined threshold value greater than the magnitude of the bus driver output voltage may be established (e.g., the reference voltage generator circuit 30 may be set to dynamically produce the reference voltage signal 32 at a predetermined threshold level (e.g., 1.0 volts) higher than the bus driver output voltage 15-1 whenever the voltage 15-1 is positive and the reference voltage generator circuit 30 may also be set to dynamically produce the reference voltage signal 34 at a threshold level of 1.0 volts lower than the voltage 15-1 whenever the voltage 15-1 is negative). In a step 406, voltage in the signal line may be monitored to determine presence of fault-induced voltage in excess of the reference voltage (e.g., whenever the signal line voltage 16-2 is lower than the voltage 32 or higher than the voltage 34, the sensor 25 may not produce the signals 26-1 nor 28-1 and the cut-off switch 22 may remain closed, but In the event of a fault that adds or subtracts voltage to the nominal signal-line voltage 16-1 in excess of the threshold +Vt or −Vt, the sensor 25 may produce signals 26-1 or 28-1). In a step 408, at least one solid-state switch may be opened in the signal line responsively to presence of fault-induced voltage in excess of the reference voltage (e.g., the sensor 25 may produce signals 26-1 or 28-1 that may result in the switch 22 opening and the switches 12 and 14 opening).

It should be understood, of course, that the foregoing relates to exemplary embodiments of the invention and that modifications may be made without departing from the spirit and scope of the invention as set forth in the following claims.

We claim:

1. Apparatus for protecting a signal line bus driver from overvoltage faults comprising:
    a first solid-state switch having a first gate to control an opening and a closing of the first solid-state switch and configured to block current having a positive voltage when open;
    a second solid-state switch configured to block current having a negative voltage when open having a second gate to control an opening and a closing of the second solid-state switch and;
    a comparator circuit connected to:
        receive bus driver output voltage from the bus driver;
        receive a reference voltage that has a magnitude that exceeds bus driver output voltage by a predetermined magnitude; and
        produce a comparator output signal responsively to a fault-induced voltage in a signal line that has a magnitude that exceeds the reference voltage,
    the first and second switches being connected in series with one another, being connected in series with the bus driver, being interposed between the bus driver and an output end of the signal line and being connected so that at least one of the solid-state switches opens responsively to the comparator output signal;
    a constant current source coupled with the gates of the first and second solid-state switches; and
    a cut-off switch interposed between the constant current source and the signal line, the cut-off switch configured to close in response to the comparator output signal so that the first and second solid-state switches open in responsive to closing of the cut-off switch.

2. The apparatus of claim 1 wherein the comparator circuit is connected to produce a positive output signal in the event of a positive fault-induced voltage and the first solid-state switch is connected to open responsively to the positive comparator output signal.

3. The apparatus of claim 1 wherein the comparator circuit is connected to produce a positive output signal in the event of a negative fault-induced voltage and the second solid-state switch is connected to open responsively to the negative comparator output signal.

4. The apparatus of claim 1 wherein the first and the second solid-state switches are connected to open simultaneously responsively to the comparator circuit output signal.

5. The apparatus of claim 1 further comprising a comparator protecting a clamping circuit interposed between the comparator circuit and the signal line.

6. The apparatus of claim 1 wherein the comparator circuit comprises:
    a first comparator connected to compare a signal line voltage against a positive reference voltage; and
    a second comparator connected to compare the signal line voltage against a negative reference voltage.

7. The apparatus of claim 1 further comprising a reference voltage generator connected to produce the reference voltage with a magnitude that has a predetermined threshold value greater than the magnitude of a signal line voltage.

8. The apparatus of claim 7 wherein the reference voltage generator comprises:
    a first operational amplifier connected to receive the bus-driver output voltage and produce a positive reference voltage output; and
    a second operational amplifier connected to receive the bus-driver output voltage and produce a negative reference voltage output.

9. The apparatus of claim 1 further comprising:
    a bus buffer interposed between the bus driver and the solid-state switches; and
    a closed loop interconnecting the bus buffer and the output end of the signal line.

10. The apparatus of claim 9 further comprising a buffer protection clamping circuit interposed between the bus buffer and the output end of the signal line.

11. A method for protecting a signal line bus driver comprising the steps of:
    monitoring a time variable bus driver output voltage;
    establishing a reference voltage with a magnitude that has a predetermined threshold value greater than the magnitude of the bus driver output voltage;
    dynamically varying the reference voltage so that a magnitude of the reference voltage continuously maintains a voltage magnitude with the predetermined threshold value greater than the magnitude of the bus driver output voltage;
    monitoring voltage on a signal line to determine presence of fault-induced voltage in excess of the reference voltage; and opening at least one solid-state switch in the signal line responsively to presence of fault-induced voltage in excess of the reference voltage.

12. The method of claim 11 wherein the step of establishing a reference voltage comprises:
establishing positive reference voltages responsively to positive bus driver output voltages; and
establishing negative reference voltages responsively to negative bus driver output voltages.

13. The method of claim 11 wherein the step of opening a switch in the signal line comprises:
opening a first solid-state switch in the event of a positive fault-induced voltage; and
opening a second solid-state switch in the event of a negative fault-induced voltage.

14. The method of claim 13 wherein the first and second solid-state switches are both opened simultaneously in the event of a positive or negative fault-induced voltage.

15. The method of claim 11 wherein the predetermined threshold value is greater than a maximum magnitude of the bus driver output voltage.

16. The method of claim 11 wherein the predetermined threshold value is less than a maximum magnitude of the bus driver output voltage.

17. A method for protecting a bus driver of a signal line comprising the steps of:

positioning a solid-state switch in the signal line between a bus driver and an output end of the signal line;
providing a positive or a negative voltage across the solid-state switch when open;
connecting a first comparator to the signal line to compare a signal line voltage of the signal line with a positive reference voltage;
connecting a second comparator to the signal line to compare the signal line voltage with a negative reference voltage;
monitoring the signal line voltage on both sides of the switch;
activating the switch responsively to detection of a differential voltage magnitude across the switch that exceeds a predetermined threshold magnitude;
protecting a comparator circuit that includes the first and second comparators by monitoring the signal line for a positive or a negative voltage at the output end of the signal line with a clamping circuit; and
blocking current in the signal line from being fed to the solid-state switch.

18. The method of claim 17 wherein the step of protecting comprises interposing a high-impedance resistor between the comparator circuit and the output end of the signal line.

* * * * *